United States Patent
Puranik et al.

(10) Patent No.: US 6,795,017 B1
(45) Date of Patent: Sep. 21, 2004

(54) RULE-BASED ACTIONS USING TRACKING DATA

(75) Inventors: Shirish Puranik, Fremont, CA (US);
Anil Tiwari, Palo Alto, CA (US);
Paresh Nagda, Fremont, CA (US);
Kenny Man D. Nguyen, Palo Alto, CA (US)

(73) Assignee: At Road, Inc., Fremont, CA (US)

( * ) Notice: Subject to any disclaimer, the term of this patent is extended or adjusted under 35 U.S.C. 154(b) by 0 days.

(21) Appl. No.: 10/377,574

(22) Filed: Feb. 28, 2003

(51) Int. Cl.⁷ .............................................. H04B 7/185
(52) U.S. Cl. .................................................. 342/357.07
(58) Field of Search ....................... 342/357.01, 357.06, 342/357.07; 701/213, 215

(56) References Cited

U.S. PATENT DOCUMENTS

| | | | |
|---|---|---|---|
| 5,731,757 A | * 3/1998 | Layson, Jr. | 340/573.1 |
| 5,959,577 A | 9/1999 | Fan et al. | |
| 6,014,080 A | * 1/2000 | Layson, Jr. | 340/573.1 |
| 6,100,806 A | * 8/2000 | Gaukel | 340/573.4 |
| 6,362,730 B2 | 3/2002 | Razavi et al. | |
| 6,408,196 B2 | 6/2002 | Sheynblat et al. | |
| 6,631,271 B1 | * 10/2003 | Logan | 345/963 |
| 2003/0036428 A1 | * 2/2003 | Aasland | 463/29 |

FOREIGN PATENT DOCUMENTS

| | | |
|---|---|---|
| WO | PCT/US00/27749 | 4/2001 |
| WO | WO 01/26288 A1 | 4/2001 |
| WO | PCT/US01/19532 | 12/2001 |
| WO | WO 01/96906 A1 | 12/2001 |
| WO | PCT/US01/22686 | 2/2002 |
| WO | WO 02/10939 A1 | 2/2002 |

OTHER PUBLICATIONS

U.S. Publication 20020184200, application No. 10/149,154.
U.S. Publication 20020065698, application No. 09/736,495.
U.S. Publication 20020042266, application No. 09/974,019.
U.S. Publication 20020002599, application No. 09/801,491.
U.S. Publication 20020033225, application No. 09/332,346.
U.S. Publication 20020124065, application No. 10/069,259.
U.S. Publication 20020013815, application No. 09/910,510.

\* cited by examiner

*Primary Examiner*—Dao Phan
(74) *Attorney, Agent, or Firm*—MacPherson Kwok Chen & Heid LLP

(57) ABSTRACT

A mobile device is configured to periodically report its tracking data. A rule set is applied to the tracking data. Based upon the application of the rule set, appropriate actions are taken.

15 Claims, 2 Drawing Sheets

RULE-BASED ACTIONS USING TRACKING DATA

RELATED APPLICATION

This application relates to U.S. Ser. No. 10/377,575, entitled "Dynamic Server Managed Profiles for Mobile Users," the contents of which are hereby incorporated by reference in their entirety.

TECHNICAL FIELD

The present invention relates generally to mobile devices enabled with location determination units, and more specifically to a technique of enforcing rule-based actions upon tracking data obtained from such devices.

BACKGROUND

Conventional mobile devices enabled with global positioning system (GPS) units allow a user to measure raw GPS data such as location (for example, by latitude and longitude), velocity, direction (compass bearing), altitude, and time. In addition, such conventional mobile devices may be configured to derive data from the raw GPS data such as an indication as to whether the device has been stationary for a period of time. As used herein, "GPS data" shall denote not only raw GPS data but also data derived from the raw GPS data.

Many GPS-enabled mobile devices are configured to do nothing but collect or measure GPS data. Although such devices are useful, users may desire additional processing on the GPS data. Such additional processing may be generalized as applying one or more rules to the GPS data and taking some action based upon the rule application. Regardless of the type of rule desired by a user, at least four separate processes are involved: 1) Configuring or setting the rule, 2) Collecting the GPS data, 3) Applying the rule to the GPS data and non-GPS data, and 4) Taking some action based upon the rule application. For example, a user may wish to know if measured velocities exceed a speed threshold. To enforce such a rule, the rule must be configured by setting the desired speed threshold, GPS data is collected, the GPS data is compared to the speed threshold, and should the speed threshold be exceeded, some type of action is taken by, e.g., alerting the user.

The four separate processes may be generalized to apply to tracking data generated by any suitable location determination method. Conventional systems that implement such rule-based actions using tracking data suffer from lack of flexibility with regard to rule configuration and application. Accordingly, there is a need in the art for improved techniques and systems regarding the enforcement of rule-based actions using tracking data.

SUMMARY

In accordance with one aspect of the invention, a method comprises configuring at least one rule at a server, generating tracking data at a mobile device though implementation of a location determination method; and applying the at least one rule on the tracking data.

In accordance with another aspect of the invention, a system comprises a network; a server coupled to the network; an GPS-enabled mobile device configured to periodically report its GPS data to the server through the network, wherein the server is configured to apply at least one rule on the reported GPS data.

DETAILED DESCRIPTION

The present invention provides systems and methods for enforcing rule-based actions using tracking data provided by a location determination method. Because mobile devices enabled with global positioning system (GPS) units provide accurate tracking data at relatively low cost, the following discussion will assume that the location determination method is GPS. It will be appreciated, however, that other location determination methods may be used—e.g., the triangulation methods implemented by cellular telephone systems may also be used as the location determination method for the techniques and systems disclosed herein.

Figure 1:
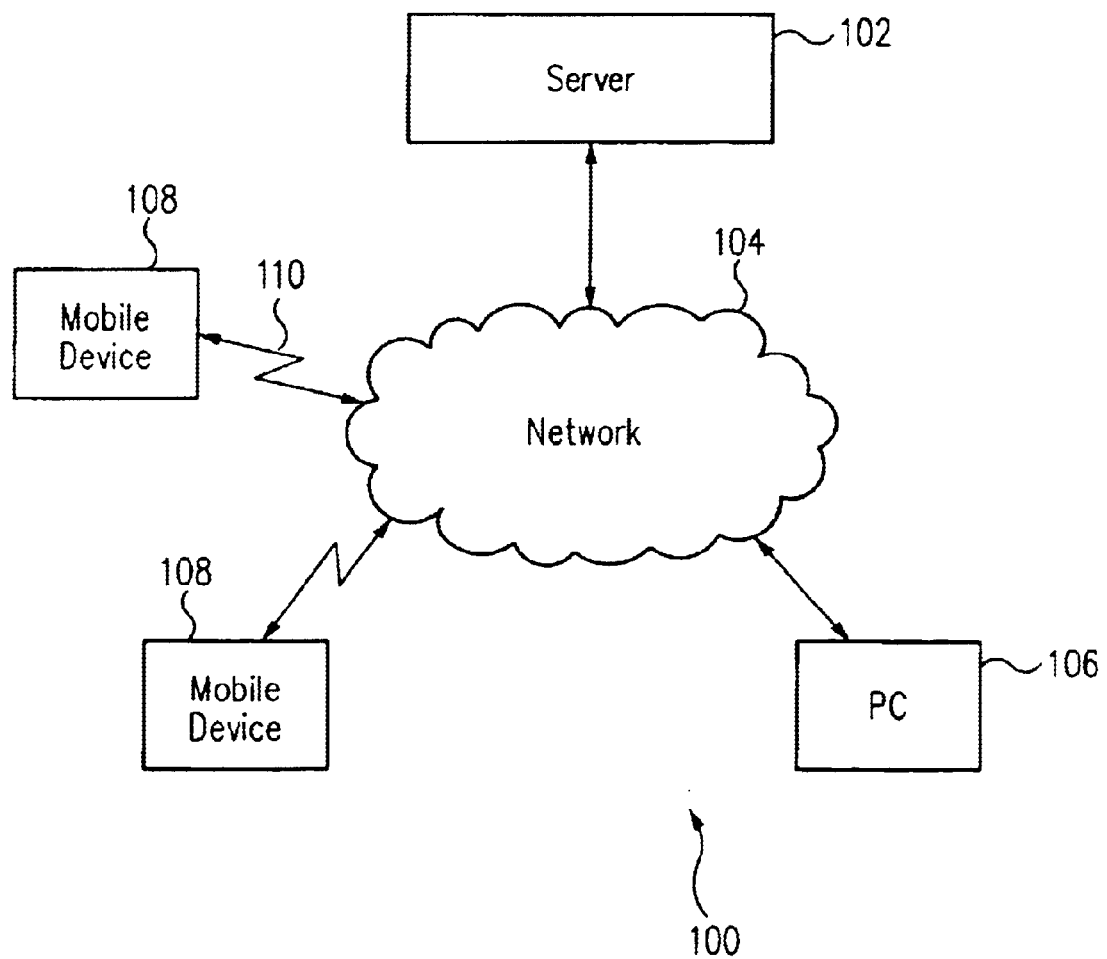
FIG. 1 shows a block diagram illustrating a system in accordance with an embodiment of the present invention.

Turning now to FIG. 1, a communication system 100 includes a network 104 (e.g., a local or wide area data network, the Internet, or a wireless network) coupling a plurality of GPS-enabled mobile devices 108 such as GPS-enabled mobile telephones to a data processing station or server 102. As is known in the art, each mobile device 108 communicates over a wireless link 110 to a server 102. Depending upon the configuration of each mobile device 108, these wireless links 110 may use TDMA, CDMA, 802.11, or other suitable protocols. Regardless of the communication protocol used on the wireless links, data may flow between mobile devices 108 and server 102. For example, each mobile device 108 may measure GPS data and transmit this data over wireless link 110 to server 102. As used herein, "GPS data" shall denote not only raw GPS data such as location (for example, by latitude and longitude), velocity, direction, altitude, and time but also data derived from the raw GPS data such an indication as to whether a mobile device has been stationary for a period of time. More generally, "tracking data" shall be used herein to denote raw navigational data derived by any location determination method and also data derived from this raw navigational data. Server 102 may also communicate with a mobile device manager coupled to network 104 through a computer 106 such as a PC. It will be appreciated, however, that the mobile device manager may also communicate with server 102 through other means such as a personal digital assistant (PDA) or telephone. Moreover, mobile devices 108 need not be implemented as mobile telephones but instead may comprise any suitable type of GPS-enabled mobile device. Further exemplary details regarding communication in systems such as system 100 may be found, for example, in U.S. Pat. No. 5,959,577, which is incorporated herein by reference in its entirety.

System 100 is configured to provide flexibility in rule configuration. Thus, the manager may configure server 102 with rules individually tailored to the various mobile devices 108. In such an embodiment, the rule configuration is centralized at server 102. Alternatively, each user may configure his or her mobile device 108 with the desired rule set. Similarly, the application of the rules is also flexible and may take place either at server 102, computer 106, or within mobile devices 108. Note that the application of the rules is independent of where the rules were configured. For example, a manager at computer 106 may configure server 102 with a rule set tailored to the individual needs of users of mobile devices 108. Server 102 may then notify mobile devices 108 that rules are available for download over network 104. Each mobile device 108 may then download its rule set such that the application of the rules takes place within mobile devices 108.

Should server 102 be configured to apply a rule set to GPS data collected at mobile units, mobile devices 108 need to periodically transmit GPS data to server 102 through network 104. Moreover, even if mobile devices 108 are configured to apply the rule set, the manager of these mobile devices 108 may have a need to access their GPS data. Rather than individually program each mobile device 108 to periodically transmit GPS data to server 102, a manager at computer 106 may request that server 102 download software that will enable the mobile device manager to specify for each mobile device 108 the GPS data reporting frequency and the specific type of GPS data reported such as location or velocity. This centralized specification may be denoted as a "profile." To receive this software download enabling response to a given profile, each mobile device 108 includes a digital interface (not illustrated) such as a packet data interface. The nature of the software download is device dependent—for a given mobile device 108 having a digital interface, the manufacturer will publish data sheets and related information so that software may be written accordingly. The software may be written in Java (e.g., a Java micro edition application environment).

Having downloaded and installed the necessary software in mobile devices 108, the users of these configured devices are ready to receive GPS data profiles as specified by the manager through commands issued at computer 106. For example, computer 106 may issue a request over network 104 to server 102 in conjunction with an authentication key. The authentication key allows the manager access to configured mobile device 108 to specify their profiles. To enhance security, authentication keys may be made time-limited such that each authentication key is valid for only a predetermined duration. Further details regarding the configuration of mobile devices 108 with profiles to control the type and frequency of GPS data updates may be found in copending application U.S. Ser. No. 10/377,575, entitled "Dynamic Server Managed Profiles for Mobile Users.

Consider the advantages of system 100 for the manager of the users of mobile devices 108. The manager may remotely configure (using computer 106) these devices with profiles individually tailored to particular needs. For example, the user of a given mobile device 108 may be a truck driver whereas another user may be a traveling salesman. The manager may then tailor the profiles accordingly—one would expect the salesman to make relatively longer stops when visiting customers than the truck driver such that the thresholds for determining whether each user has parked may be set accordingly. For example, the salesman's mobile device may be configured to transmit a "parked" GPS data indication after 30 minutes of being stationary whereas the truck driver's mobile device may be configured to transmit a "parked" GPS data indication after only 10 minutes of being stationary. Advantageously, the profiles are set by the manager remotely so that the users of mobile devices 108 need not be trained in or involved with the profile configuration. Furthermore, the manager need not be the manager of a commercial enterprise—the mobile device or telephone users may be members of an exercise organization such as a tack team and the profiles correspond to a desired workout routine. Alternatively, the users of mobile devices 108 may be family members.

Once the mobile devices 108 are configured with a desired profile, they may begin reporting their GPS data to server 102. As is known in the art, the reporting of GPS data such as location may occur in several forms. For example, a mobile device 108 may provide partial position information (e.g., pseudoranges in a GPS system), which is transmitted to server 102 for refinement with differential GPS techniques. Alternatively, a mobile telephone 108 may provide position information in the form of latitude and longitude alone or in conjunction with additional information such as which GPS satellites were used to obtain the latitude and longitude measurements.

Having received GPS data such as position, velocity (and the time these measurements were taken) for the mobile telephone users, server 102 may further process the information according to the present invention by taking rule-based actions as determined by the collected GPS data. Certain rule-based actions may be determined using comparison operations such as "less than" or "greater than" with respect to predetermined thresholds such that events within the collected GPS data that violate these thresholds may be denoted as "exceptions." For example, a velocity or speed exception may be defined by the manager to flag users of mobile telephones 108 within vehicles that exceed a maximum speed for a predetermined time period. Server 102 may enforce rules on collected GPS data for 24 hours a day or periodically as specified by the manager.

With respect to a manager of commercial users of GPS-enabled mobile devices, the rules defined for the collected GPS data would typically relate to business efficiency. For example, a manager may desire that a commercial delivery at given locations (e.g., a certain brand of grocery store) should take no longer than 30 minutes. Because this rule relates to business efficiency, it may be denoted as a type of business metric or measure. Accordingly, server 102 could be configured with the rule or business metric that if a given mobile device's location corresponds to an outlet of this grocery store and the time spent at this location exceeds 30 minutes, an action should be taken. This action may take any suitable form such as transmitting a text message to either computer 106 or the given mobile device (or both of these actions may be taken). Should the given mobile device comprise a GPS-enabled mobile telephone, the text message may be in SMS format. Alternatively, server 102 may take action by sending a voicemail to the affected mobile telephone 108.

Regardless of the type of rule-based actions a manager may wish to define, the enforcement of the rules into the subsequent actions may be implemented by the mobile device 108, server 102, or computer 106. Thus, it will be understood that the present invention is not limited to enforcing rules on GPS data at server 102 alone. In alternative embodiments of the invention, mobile devices 108 may enforce the rules. In addition, the computer 106 may receive collected GPS data from server 102 and make rule-based decisions. Moreover, the domain for the rules need not be limited to GPS data—instead, the rules may also be based upon data that does not just comprise GPS data. For example, a rule may be implemented with respect to a mobile telephone 108 being used to make a purchase at a given location. Here, the GPS data would comprise location. The additional data would be that a purchase took place. A rule may thus be defined that if a mobile telephone is used to make a purchase at a given location, a certain action should take place, e.g., discount the purchase by a predetermined amount.

Numerous rules (which as described above may be denoted as business metrics with respect to commercial goals) may be defined by the manager at computer 106 with regard to GPS data such as velocity, location, and whether a mobile device 108 has been stationary for a period of time. In one embodiment of the invention, a stop business metric may be defined that accumulates the total daily stop time for a given user of a mobile device 108 at predetermined locations or locations that are not expected as stops. A manager may use this business metric to determine if users are spending too much time at non-revenue generating facilities such as a home office or base location. In such an instance, the manager would define the location as the home office and set the time threshold accordingly, e.g., 30 minutes. A similar business metric may be denoted as a zone exception. The zone exception flags arrivals and departures from a predetermined region. The predetermined region may be defined as a certain zipcode or zipcodes, city boundary, county, state, or country or however else a manager may wish to define the predetermined region such as by using a time zone.

The manager may also designate certain locations as landmarks to server 102. A business metric denoted as a landmark proximity exception would correspond to a user of a mobile device 108 either arriving or departing (or both) from these landmarks. Should this exception correspond to arrival, it may thus be triggered by comparing the separation between a mobile telephone's reported position to that of the landmark and indicating arrival when the separation is less than a defined threshold for a predetermined period. Similarly, departure may be triggered when the separation is greater than the defined threshold for the predetermined period.

An analogous business metric may be denoted as a landmark exception. This exception is triggered when a mobile device's position is reported as stopped at a landmark. In contrast to a landmark exception, a landmark proximity exception does not require that the vehicle containing the mobile telephone 108 be stopped.

Should a manager wish to determine if users are meeting each other, a business metric denoted as a vicinity exception may be defined. This exception is triggered when two or more mobile devices report their position as stopped when their separation is less than a predetermined threshold. Advantageously, a manager may then be alerted should the mobile employees engage in excessive socializing.

A business metric denoted as a stop count exception may be defined by a manager setting either a minimum or maximum (or both) number of stops a given user of a mobile device 108 may make within a predefined period such as 24 hours. Should server 102 detect that a user has exceeded the maximum or be below the minimum number of stops, a stop count exception would be generated.

A number of actions may be taken in response to applying a rule on the GPS data. For example, server 102 may notify the user of a mobile telephone 102 with either a prerecorded voicemail or a text message that an exception has occurred. Similarly, server 102 may notify computer 106 with e-mail reports either in real time or grouped periodically such as daily. Alternatively, a workflow process may be initiated at computer 106 such as sending a bill out to a customer. Should server 102 be configured to e-mail reports to computer 106, any suitable presentation format for these e-mail reports may be used such as Microsoft Excel®. Alternatively, the manager may access the server through, for example, a web browser and request a report of exceptions by the fleet of mobile telephone users. This report may be viewed online or downloaded in a suitable format such as Microsoft Excel®.

Figure 2:
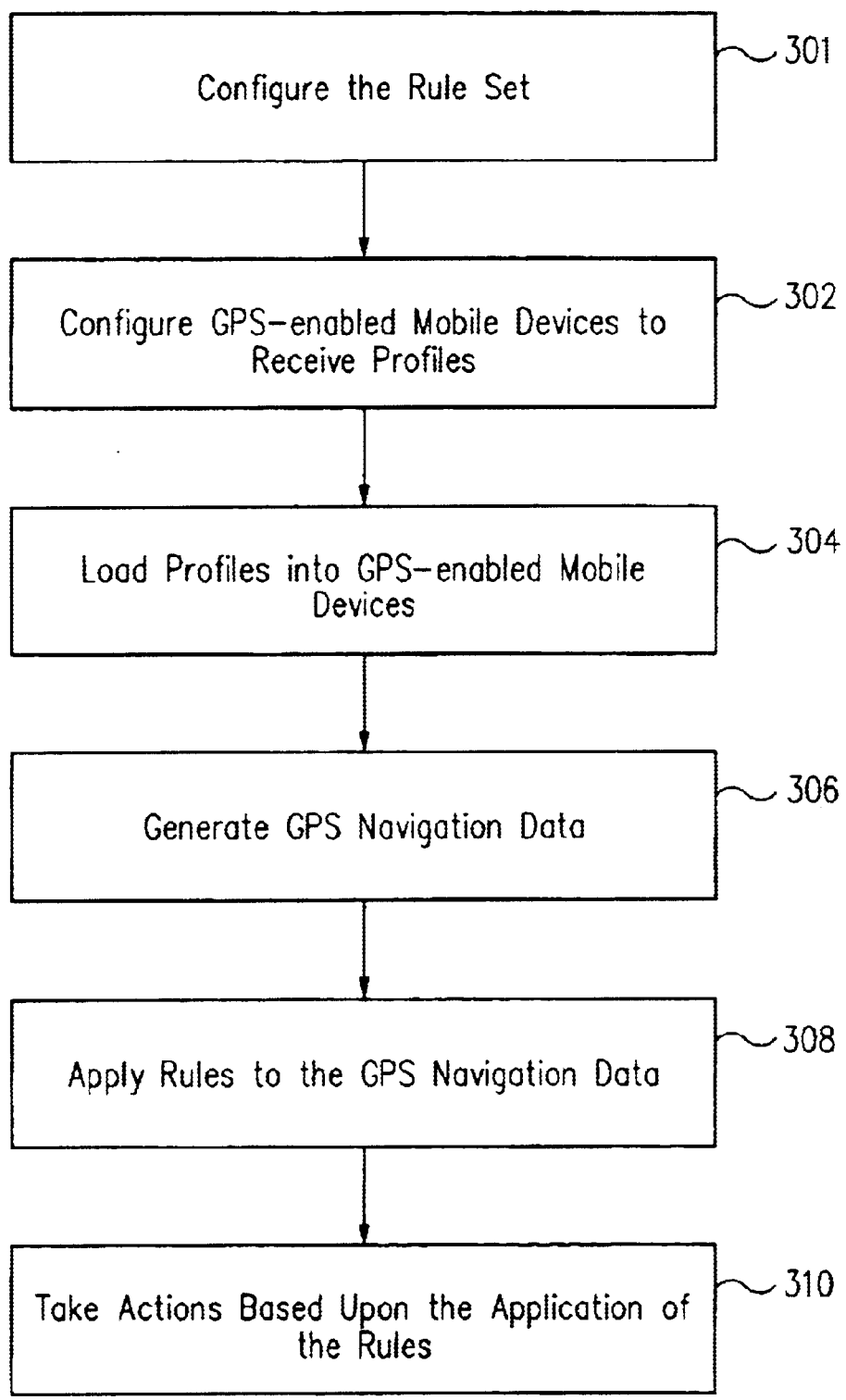
FIG. 2 is a flowchart for applying rules on GPS data according to one embodiment of the invention.

Turning now to FIG. 2, a flowchart summarizing the enforcement of rule-based actions on GPS data is illustrated with respect to system 100. At step 301, the manager configures a rule set at server 102. Advantageously, this configuration is dynamic—the manager may configure server 102 with whatever rule is desired for a given application. The rules may use not only GPS data but also non-GPS data as described herein. At step 302, GPS-enabled mobile devices 108 are configured to receive profiles as discussed above. This configuration may occur by having the manager command server 102, using computer 106, to signal mobile telephones 108 that a software download is available. Upon receiving a message that a download is available, the users of mobile telephones 108 may then command their handsets to receive the download from server 102 through network 104. It will be appreciated that configuration step 302 is optional in that a GPS-enabled mobile device 108 could be manufactured to report GPS data at a predetermined rate. Assuming that this rate was acceptable and such GPS-enabled mobile devices could be configured to transmit the position metrics to the server, no further configuration by a manager would be necessary.

At step 304, the profiles are loaded into mobile devices 108. This step may be initiated by the manager (who may also be denoted as a system administrator) at computer 106 configuring server 102 with the desired profile for each mobile device 108. Upon receiving a message that a profile is available, the users of mobile devices 108 may then command their handsets to receive the profile from server 102 through network 104. As discussed with respect to step 302, this step is optional for "pre-configured" GPS-enabled mobile devices.

At step 306, GPS-enabled mobile devices 108 generate GPS data and transmit the GPS data to server 102 according to their profiles. For example, a GPS-enabled mobile device 108 may be required by its profile to report position, velocity, and stop status to server 102 every 3 minutes.

At step 308, rules determined by the system administrator are applied on the generated GPS data by server 102. Alternatively, each mobile device may receive its rule set from server 102 and apply its rule set on the GPS data it generates. Accordingly, the application of the rules may occur wherever it is most appropriate—e.g. if the rule operates only on data generated by mobile devices 108, then each mobile device 108 may be the most efficient place to compute the rule.

Finally at step 310, actions are taken based upon the application of the rules in step 308. For example, if the rule set includes a maximum velocity rule and one of the mobile devices 108 violates this rule, the action may comprise having server 102 alert the system administrator regarding the violation. Alternatively, server 102 may alert the mobile device that generated the velocity triggering the violation.

Such feedback is advantageous for facilitating self management by users.

The above-described embodiments of the present invention are merely meant to be illustrative and not limiting. It will thus be obvious to those skilled in the art that various changes and modifications may be made without departing from this invention in its broader aspects. The appended claims encompass all such changes and modifications as fall within the true spirit and scope of this invention.

What is claimed is:

1. A method, comprising
   (a) configuring at least one rule at a server;
   (b) downloading from the server to a mobile device a profile, the profile indicating how often the mobile device should report tracking data and the type of tracking data being reported;
   (c) generating tracking data at the mobile device through implementation of a location determination method;

(d) uploading tracking data from the mobile device to the server according to the profile; and (e) applying the at least one rule on the tracking data.

2. The method of claim 1, wherein the server applies the at least one rule on the tracking data.

3. The method of claim 1, wherein the mobile device applies the at at least one rule on the tracking data.

4. The method of claim 2, wherein the location determination method is GPS and the tracking data is GPS data.

5. The method of claim 4, wherein the mobile device is a mobile telephone or a PDA.

6. The method of claim 1, wherein the tracking data comprise location, velocity, and time.

7. The method of claim 6, wherein step (d) comprises determining if the velocity determined by the mobile device exceeds a maximum velocity threshold.

8. The method of claim 1, wherein the tracking data comprise location and an indication of whether the mobile device has determined it has been stationary for a predetermined period of time.

9. The method of claim 8, wherein the at least one rule comprises testing whether the mobile device is stationary and whether its location matches a predetermined location.

10. The method of claim 9, wherein step (d) further comprises applying the at least one rule on data that is not tracking data.

11. The method of claim 10, wherein the data that is not tracking data is an indication of whether the mobile device has been used to make a purchase.

12. A system, comprising:

a network;

a server coupled to the network, wherein the server is configured to download a profile, the profile indicating how often a mobile device should report tracking data and the type of tracking data being reported; and a GPS-enabled mobile device configured to periodically upload to the server tracking data according to the profile, wherein the sever is configured to apply at least one rule to the reported GPS data.

13. The system of claim 12, wherein the tracking data comprise reported velocities, locations and time.

14. The system of claim 13, wherein the at least one rule comprises testing whether a maximum velocity threshold is violated and wherein the server determines whether the reported velocities exceed the maximum velocity threshold.

15. The system of claim 12, wherein the network is the Internet.

* * * * *